United States Patent Office.

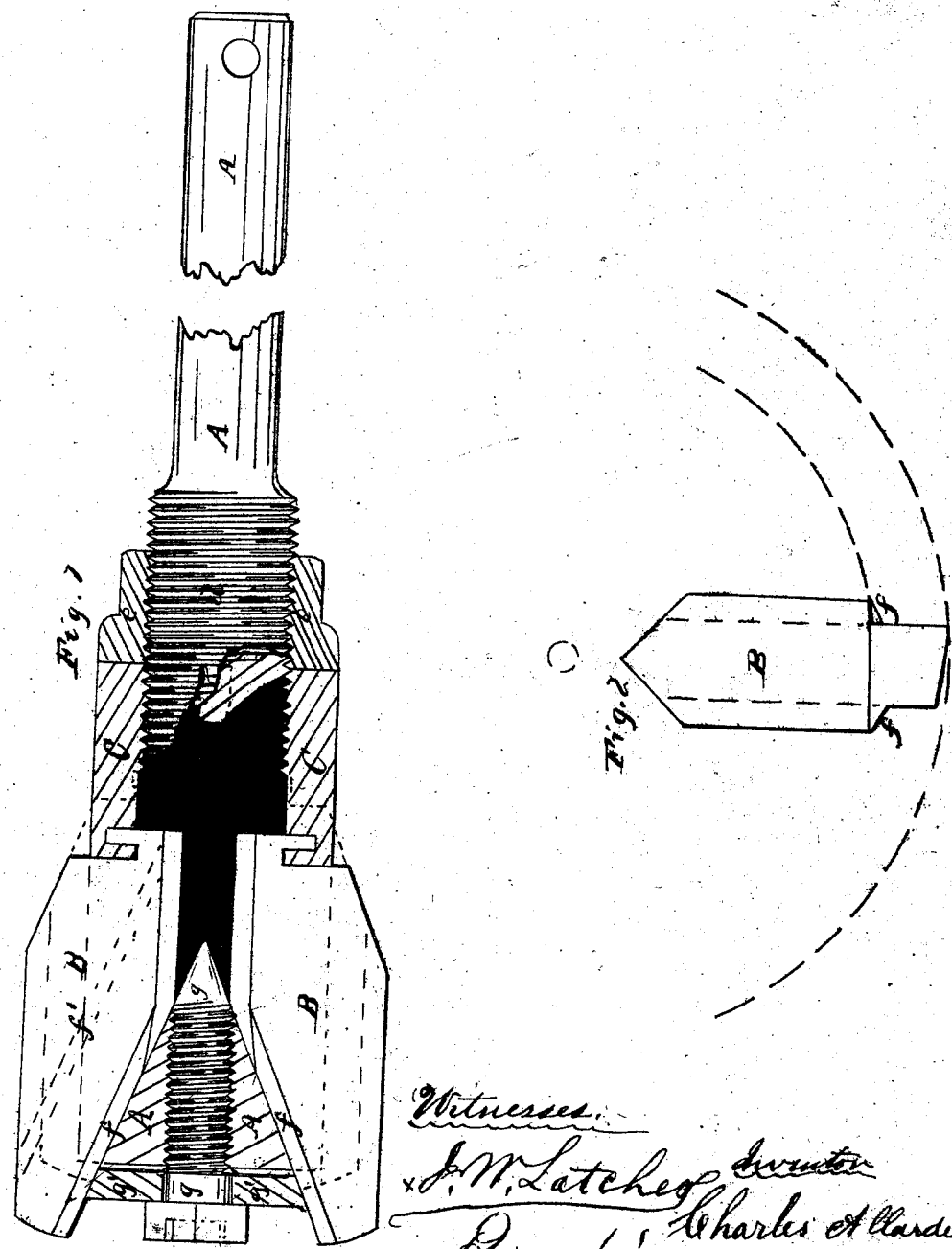

CHARLES ALLARDICE, OF COHOES, NEW YORK.

Letters Patent No. 71,943, dated December 10, 1867.

---

IMPROVED REAMER.

---

*The Schedule referred to in these Letters Patent and making part of the same.*

---

TO ALL WHOM IT MAY CONCERN:

Be it known that I, CHARLES ALLARDICE, of Cohoes, in the county of Albany, and State of New York, have invented a new and useful Reamer, or Expanding-Bit, for boring and reaming holes to various calibres; and I do hereby declare that the following is a full, clear, and exact description of the construction and operation of the same, reference being had to the annexed drawings making a part of this specification, in which—

Figure 1 is a longitudinal sectional view of my reamer, showing the inclined plane, upon which slide the base of the adjustable cutters shown in Figure 2, which represents a front-end view of the said cutters, and showing in red lines the depth of the reaming.

To enable others skilled in the art to fully understand and to construct the same, I will proceed to describe the same, as follows:

A, fig. 1, represents the shank or stock, into which are formed three, four, or more inclined radial slots, with channels or grooves, the whole to correspond with and admit of the free sliding of the cutters B backward and forward obliquely to the axis of the said shank A, by being engaged with and actuated by the annular nut or screw-ring C, as shown in fig. 1. Said nut C is fitted to the screw-thread $d$ on the shank A. A check-nut, $e$, presses against the nut C when it is desired to keep the cutters B secure or rigid, as respects end motion. The cutters B may be provided with as many parallel lugs $f$ as may be thought desirable, as is shown in dotted lines $f'$, fig. 1, with as many corresponding grooves. The rear end of the cutters is hook-shaped outward, in order to be engaged with and actuated by the nut or screw-ring C. A screw-thread is formed in the forward end of the shank A, into which a bolt, $g$, with its point made a true taper, corresponding to the inclined cutter slots, as is represented in the drawing, fig. 1, said point being hardened so as to come in contact with and hold the cutters B midway, with the addition of the bevelled washer $g'$, adjustable against the base of the cutters B, both of which arrangements serve to hold in a very secure manner the said cutters from unnecessary radial action or motion, and by being resisted by the lugs and channels $f f'$.

The operation of this reamer is as follows: The check-nut $e$ is turned back from the female nut C; the bolt $g$ is turned to the left, which frees the cutters B; now carry the cutters backward (or forward) by means of the annular nut C, so that the cutters will "caliper" the required size; now screw the check-nut against the nut C, and bolt $g$ against the base of the cutters B; they are then secure, and the reamer may now be used.

1. I claim a shank, A, formed substantially as described, in combination with the cutters B and nut or screw-ring C, the whole operating as set forth.

2. I claim, in combination with the shank A, cutters B, and nut C, the nut $e$, bolt $g$, and washer $g'$, formed as described, and employed for the purposes specified.

CHARLES ALLARDICE.

Witnesses:
   J. W. LATCHER,
   P. D. NIVER.